United States Patent
Donabedian et al.

(10) Patent No.: US 9,475,524 B2
(45) Date of Patent: Oct. 25, 2016

(54) EXPANDABLE ROOF PANEL PERIMETER REINFORCEMENT

(71) Applicant: Ford Global Technologies, LLC, Dearborn, MI (US)

(72) Inventors: Edgar Edward Donabedian, Livonia, MI (US); Darrin Neil Wagner, Bloomfield Hills, MI (US); Mark Keller, Birmingham, MI (US); Bruno M. Barthelemy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/841,873

(22) Filed: Sep. 1, 2015

(65) Prior Publication Data
US 2015/0367893 A1 Dec. 24, 2015

Related U.S. Application Data

(63) Continuation of application No. 14/220,165, filed on Mar. 20, 2014, now Pat. No. 9,162,713.

(51) Int. Cl.
| | | |
|---|---|---|
| B62D 27/02 | (2006.01) | |
| B62D 25/06 | (2006.01) | |
| B62D 29/00 | (2006.01) | |
| B29C 44/12 | (2006.01) | |
| B62D 65/02 | (2006.01) | |

(52) U.S. Cl.
CPC ......... *B62D 27/026* (2013.01); *B29C 44/1228* (2013.01); *B62D 25/06* (2013.01); *B62D 29/002* (2013.01); *B62D 65/024* (2013.01)

(58) Field of Classification Search
CPC  B62D 27/026; B62D 65/024; B62D 29/002; B29C 44/1228

USPC ............................................. 296/210, 203.01
See application file for complete search history.

(56) References Cited

U.S. PATENT DOCUMENTS

| | | | | |
|---|---|---|---|---|
| 4,219,230 A | * | 8/1980 | Lapine | ..................... B60J 10/82 296/201 |
| 4,475,765 A | | 10/1984 | Vogt et al. | |
| 5,934,743 A | | 8/1999 | Nohr et al. | |
| 5,968,298 A | * | 10/1999 | Staquet | ................... B29C 73/04 156/256 |
| 7,850,226 B2 | * | 12/2010 | Hedderly | ............. B62D 21/152 296/193.01 |
| 8,272,683 B2 | | 9/2012 | Brown et al. | |

(Continued)

OTHER PUBLICATIONS

"Aluminum Roof Replacement on the Mitsubishi Lancer Evolution and Outlander," I-CAR Advantage Online, Mar. 31, 2010, 2 pages.

*Primary Examiner* — Pinel Romain
(74) *Attorney, Agent, or Firm* — Jason C. Rogers; Price Heneveld LLP (57) ABSTRACT

A vehicle roof frame includes an adhering structure having an adhesive carrier and an expanding structural adhesive coupled to at least a portion of an outer surface of the adhesive carrier. The expanding structural adhesive includes an installation state and a structural state, and the structural state has a larger volume than the installation state. The vehicle roof frame also includes a plurality of vehicle frame members that cooperate to form a frame joint and a joint cavity defined within the frame joint. The adhering structure is disposed within the joint cavity and the adhesive carrier and the expanding structural adhesive in the structural state substantially occupies the joint cavity and fixably couples the plurality of framing members such that the frame joint is free of supplemental mechanical connections proximate the joint cavity.

20 Claims, 6 Drawing Sheets

(56) References Cited

U.S. PATENT DOCUMENTS

| | | |
|---|---|---|
| 8,424,961 B2 | 4/2013 | Carsley et al. |
| 8,439,434 B2 | 5/2013 | Newberg et al. |
| 8,567,838 B2 | 10/2013 | Coakley et al. |
| 2002/0005656 A1* | 1/2002 | Seifert .................. B62D 25/06 296/210 |
| 2012/0227887 A1 | 9/2012 | Auchter-Bruening |
| 2013/0200657 A1 | 8/2013 | Shirai |
| 2013/0285417 A1 | 10/2013 | Yoshida |

* cited by examiner

EXPANDABLE ROOF PANEL PERIMETER REINFORCEMENT

CROSS-REFERENCE TO RELATED APPLICATION

The present application is a continuation of U.S. patent application Ser. No. 14/220,165 filed Mar. 20, 2014, entitled EXPANDABLE ROOF PANEL PERIMETER REINFORCEMENT, the entire disclosure of which is hereby incorporated herein by reference.

FIELD OF THE INVENTION

The present invention generally relates to a reinforcement for a vehicle frame joint, and more specifically, an expandable perimeter reinforcement for vehicle joints including roof panel joints.

BACKGROUND OF THE INVENTION

Typically, as vehicle frames are constructed, certain portions of the frame are difficult to reach or access in order to perform various welding functions to fully reinforce the vehicle frame. These accessibility limitations can affect the efficiency in which a vehicle frame is constructed. Additionally, in various vehicles that require enhanced reinforcement, the issues of accessibility of welding mechanisms can be exacerbated, such that design choices for where to weld the various framing members can be very limited.

SUMMARY OF THE INVENTION

According to one aspect of the present invention, a vehicle roof frame includes an adhering structure having an adhesive carrier and an expanding structural adhesive coupled to at least a portion of an outer surface of the adhesive carrier. The expanding structural adhesive includes an installation state and a structural state, and the structural state has a larger volume than the installation state. The vehicle roof frame also includes a plurality of vehicle frame members that cooperate to form a frame joint and a frame joint defined within the frame joint. The adhering structure is disposed within the joint cavity and the adhesive carrier and the expanding structural adhesive in the structural state substantially occupies the frame cavity and fixably couples the plurality of frame members such that the frame joint is free of supplemental mechanical connections proximate the joint cavity.

According to another aspect of the present invention, a vehicle joint frame includes a plurality of vehicle frame members at least partially defining a joint cavity, an adhesive carrier disposed in the joint cavity and an expanding structural adhesive disposed on an outer surface of the adhesive carrier and fixedly coupling the plurality of vehicle frame members. The adhesive carrier and the expanding structural adhesive substantially fill the joint cavity.

According to another aspect of the present invention, a method of forming a vehicle frame joint includes the steps of forming an adhering structure having an adhesive carrier and an expanding structural adhesive disposed on at least a portion of an outer surface of the adhesive carrier, wherein the expanding structural adhesive is in a contracted state, placing a plurality of vehicle frame members to cooperatively form a frame joint and a joint cavity defined within the frame joint, placing the adhering structure within the joint cavity, wherein the adhering structure is capable of limited movement when the expanding structural adhesive in is the contracted state and curing the adhesive layer. The method further includes the step of curing the expanding structural adhesive to expand to a structural state and substantially fill the joint cavity and form a substantially fixed connection between the plurality of vehicle frame members. The substantially fixed connection is free of supplemental mechanical connections proximate the joint cavity.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
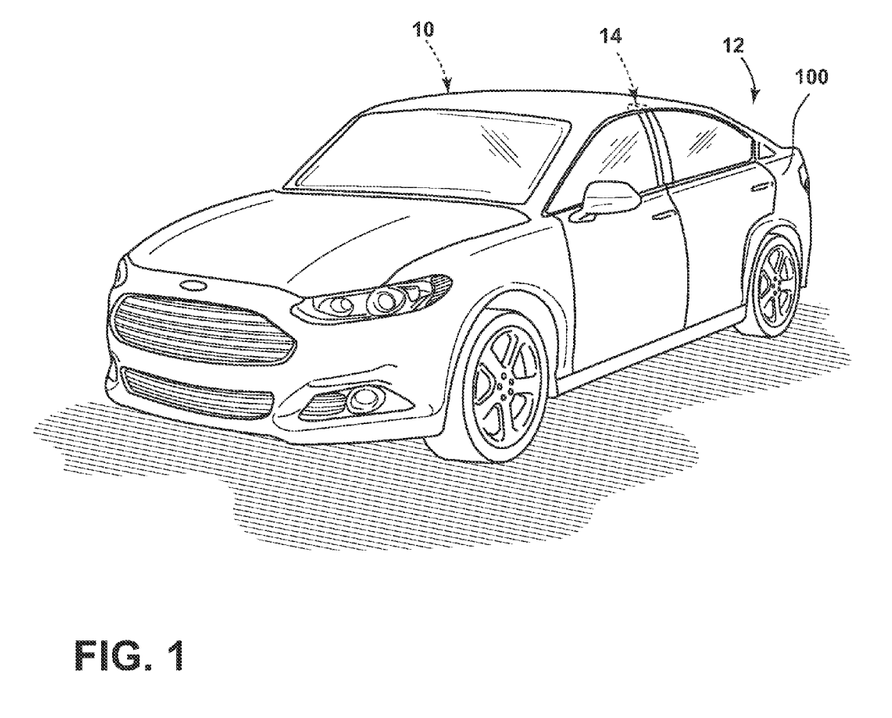
FIG. 1 is a front side perspective view of a vehicle with an embodiment of the expandable reinforcement installed therein.
Figure 2:
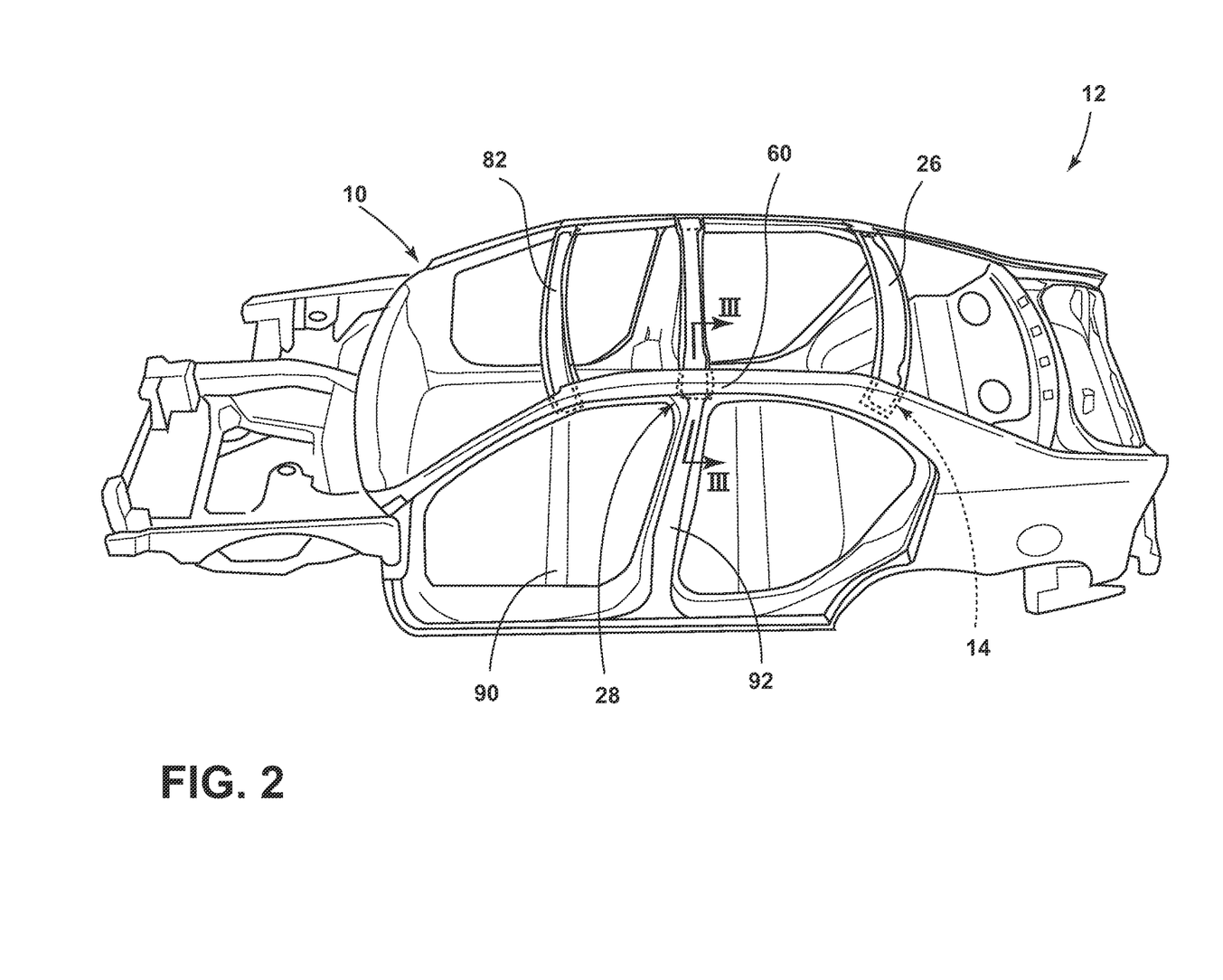
FIG. 2 is a top perspective view of a vehicle frame with an alternative embodiment of the expandable reinforcement installed therein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a frame installed within a vehicle, wherein the frame 10 includes an adhering structure 14 having an adhesive carrier 16 and an expanding structural adhesive 18 coupled to at least a portion of an outer surface 20 of the adhesive carrier 16. The expanding structural adhesive 18 includes a contracted installation state 22 and an expanded structural state 24, wherein the structural state 24 includes a larger volume of the installation state 22. A plurality of vehicle frame members 26 cooperate to form a frame joint 28 and a joint cavity 30 defined within the frame joint 28. The adhering structure 14 is disposed within the joint cavity 30, wherein the adhesive carrier 16 and the expanding structural adhesive 18, in the structural state 24, substantially occupies the joint cavity 30 and fixedly couples the plurality of frame members 26 such that the frame joint 28 is free of supplemental mechanical connections proximate the joint cavity 30.

Figure 3:
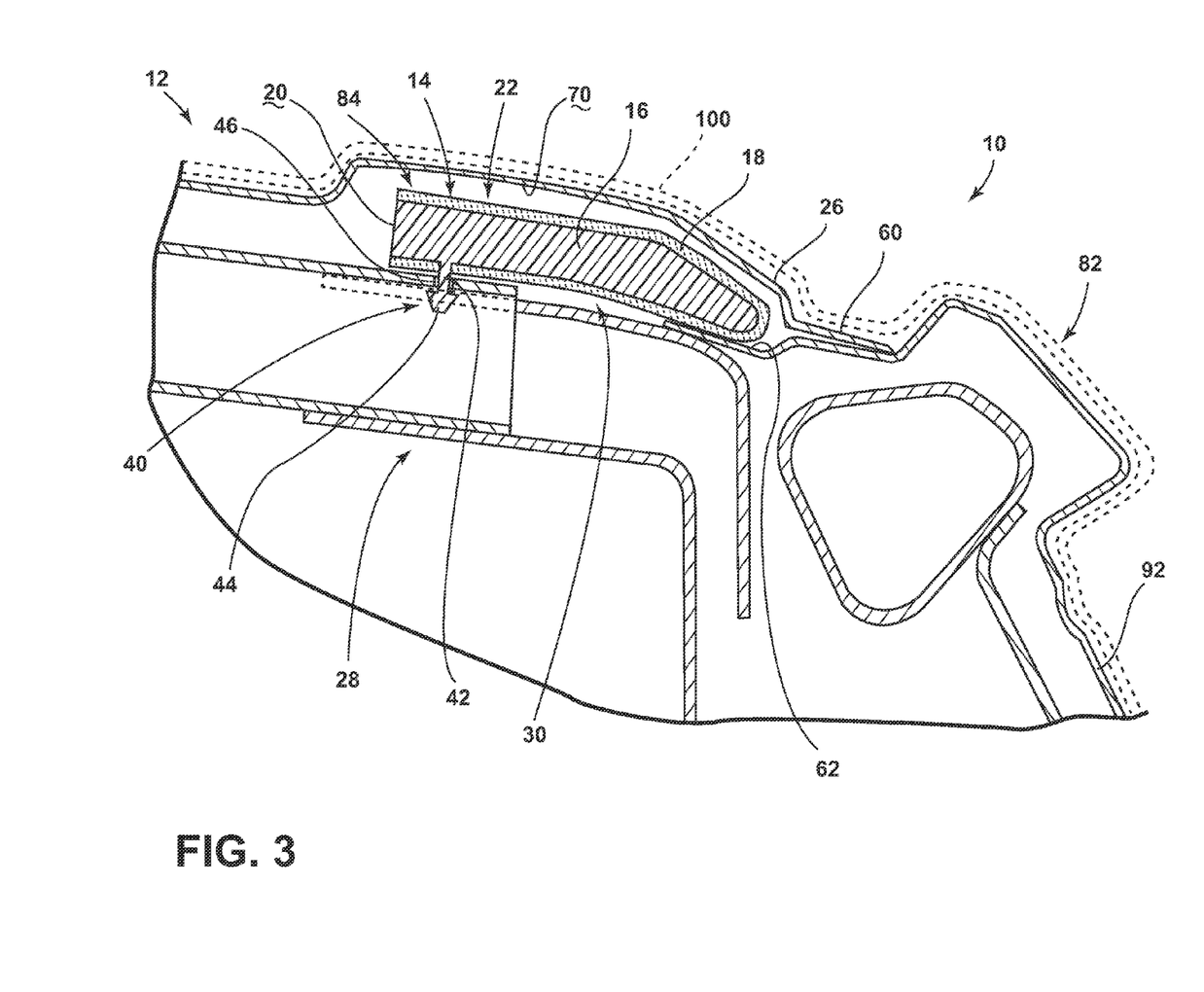
FIG. 3 is a cross-sectional view of the vehicle frame of FIG. 2 taken at line III-III with the expandable reinforcement in an installation state.
Figure 4:
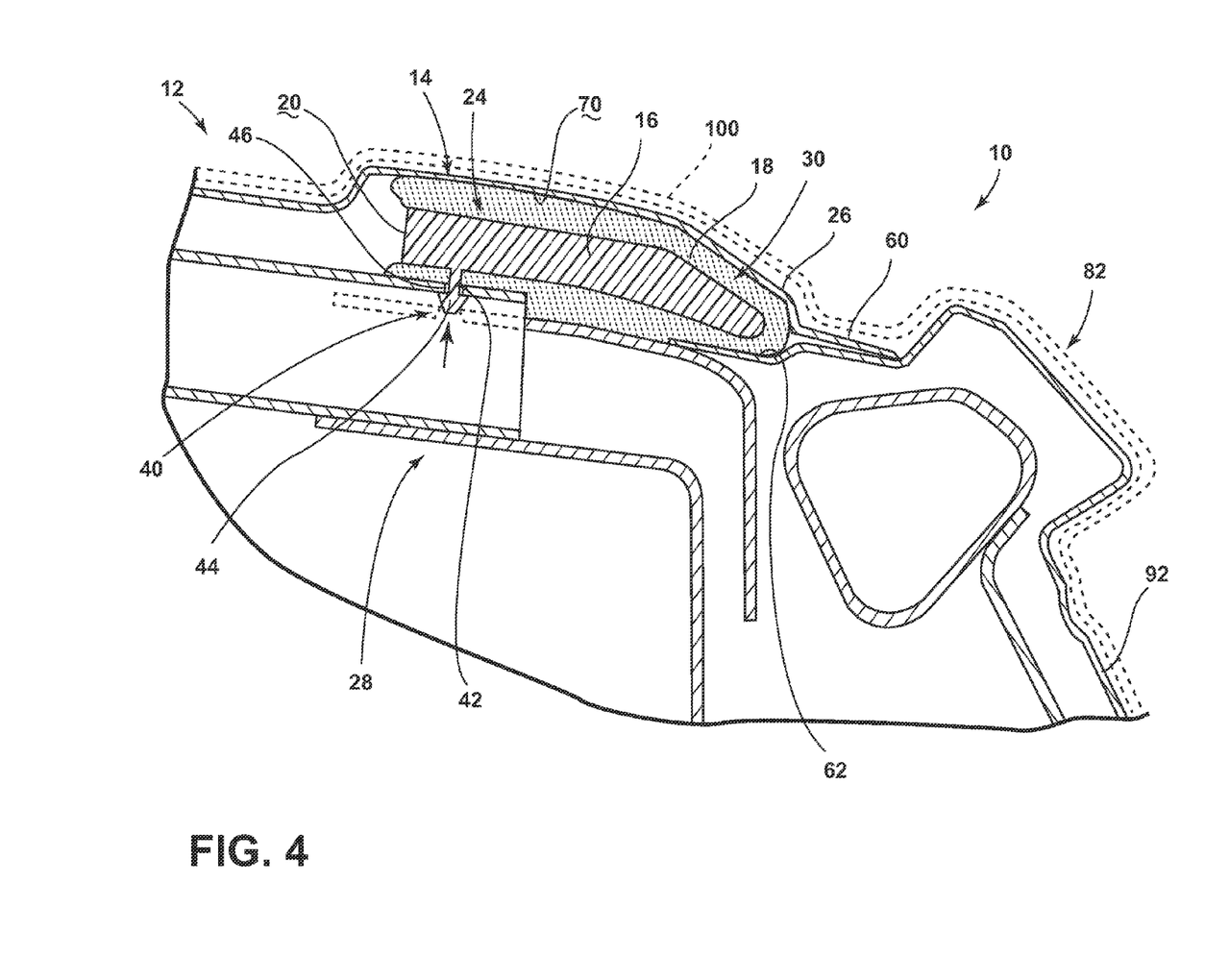
FIG. 4 is a cross-sectional view of the vehicle of FIG. 3 with the expandable reinforcement in a structural state.
Figure 5:
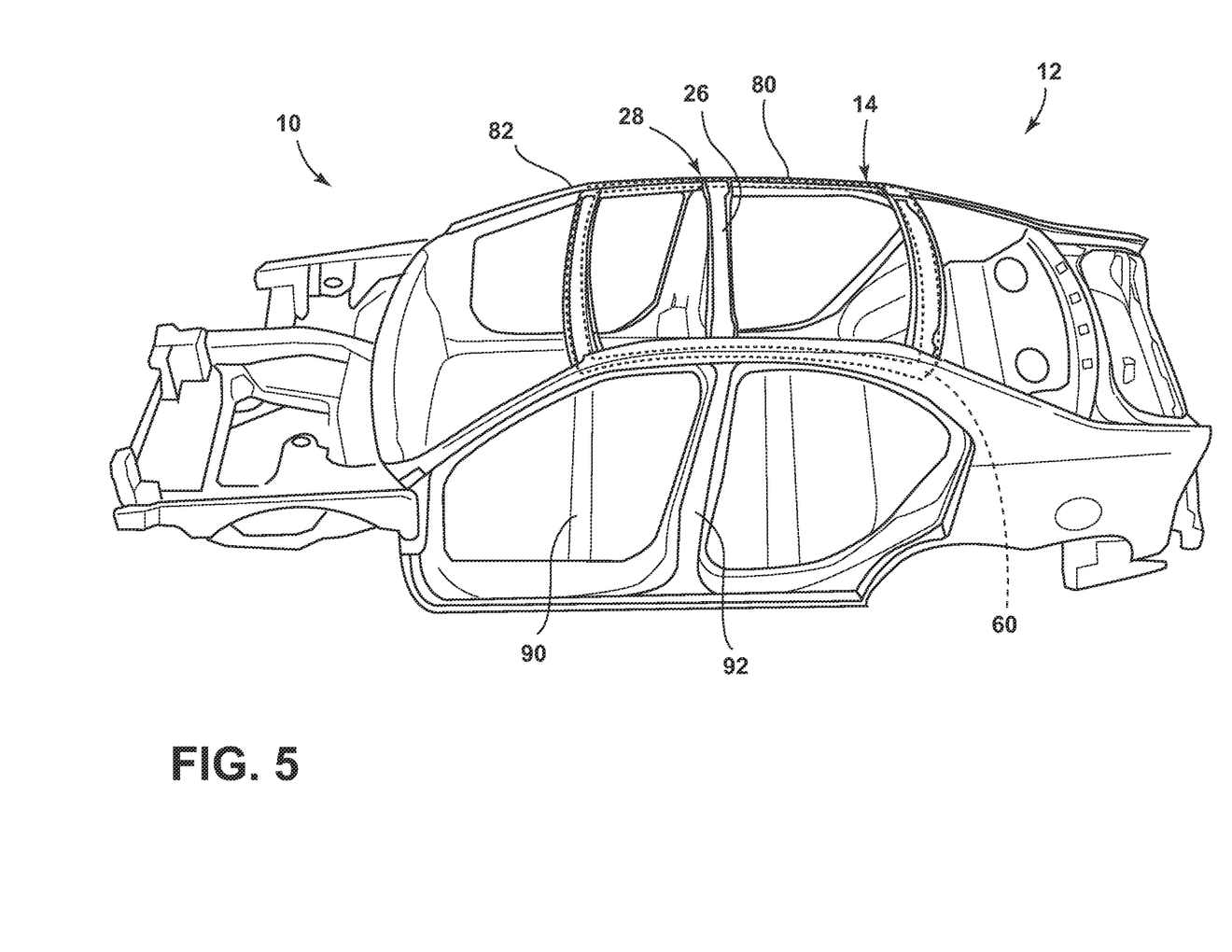
FIG. 5 is a perspective view of a vehicle frame with another alternative embodiment of the expandable reinforcement installed therein.

Referring now to FIGS. 3 and 4, the adhesive carrier 16 can include an integral attachment clip 40 that engages at least one of the vehicle frame members 26 of the frame 10 of the vehicle 12. In the various embodiments, the attachment clip 40 includes a post 42 that extends from the outer surface 20 of the adhesive carrier 16 and extends to a retaining feature 44 disposed at the opposing end of the post 42. At least one of the plurality of frame members 26 includes a clip receptacle 46 for receiving and securing the retaining feature 44 of the attachment clip 40. In this manner, the post 42 of the attachment clip 40 is slidably engaged within the clip receptacle 46, such that the adhering structure 14 is allowed limited movement within the joint cavity 30 when the attachment clip 40 is secured within the clip receptacle 46. The expanding structural adhesive 18 is in the installation state 22. In this manner, when the adhering structure 14 is disposed within the joint cavity 30, the adhering structure 14 can be shifted and moved within the joint cavity 30 to ensure proper alignment of the adhering structure 14 within the joint cavity 30.

In the various embodiments, it is also contemplated that the attachment clip 40 is integrally formed as part of the adhesive carrier 16. It is also contemplated that the attachment clip 40 can be a separate piece that is attached to the adhesive carrier 16 by welding, mechanically fastening, adhering or otherwise connecting the attachment clip 40 to a predetermined portion of the adhesive carrier 16. It is further contemplated that the retaining feature 44 and the post 42 can be integrally formed. In such an embodiment, portions of the retaining feature 44 can be substantially flexible to allow the retaining feature 44 to pass through the clip receptacle 46 and be substantially retained therein. The retaining feature 44 and the clip receptacle 46 can also be cooperatively formed such that the retaining feature 44 and the clip receptacle 46 include tabs, protrusions, recesses or other similar forms. These forms allow the retaining feature 44 to pass through the clip receptacle 46 in a predetermined configuration, but not be removed when the adhering structure 14 is placed in the final position within the joint cavity 30. In various embodiments, it is contemplated that where the attachment clip 40 is a separate piece that can be attached to the adhesive carrier 16, the attachment clip 40 can be inserted through the clip receptacle 46, opposite the adhesive carrier 16, and attached to the adhesive carrier 16 positioned in the joint cavity 30. In this manner, the connection of the attachment clip 40, through the clip receptacle 46, and to the adhesive carrier 16 serves to substantially position the adhering structure 14 in the predetermined position before being cured.

Referring again to FIGS. 3 and 4, as the expanding structural adhesive 18 is cured, as will be described more fully below, the expansion of the expanding structural adhesive 18 moves the adhering structure 14 within the joint cavity 30. As the adhering structure 14 moves within the joint cavity 30 during the expansion of the expanding structural adhesive 18, the engagement between the attachment clip 40 and the clip receptacle 46 of the vehicle frame 10 is configured to guide the movement of the adhering structure 14 within the joint cavity 30 to substantially insure proper alignment of the adhering structure 14 within the joint cavity 30. Accordingly, the various frame members 26 of the vehicle frame 10 are joined together through the use of the adhering structure 14 without the need for individual welding between the members at points within the joint cavity 30, which may be difficult for various welding apparatus to reach. It is contemplated that exterior portions 60 of the various frame members 26 can be welded through spot welding, laser welding, and other welding operations. However, in certain vehicles, it is necessary to provide additional structural reinforcement through structural connections that are disposed on interior portions 62 and exterior portions 60 of the various frame joints 28. In this manner, the adhering structure 14 substantially minimizes the need for complex welding operations and mechanisms in order to provide this additional reinforcement upon interior portions 62 of the frame joint 28 proximate the joint cavity 30. In this manner, the adhering structure 14 being placed within the joint cavity 30 and the expanding structural adhesive 18 being bonded to the frame joint 28 can eliminate the need for supplemental mechanical connections within the joint cavity 30. Such supplemental mechanical connections can include, but are not limited to, welds, nut and bolts connections, rivets, screws, hooks, pins, combinations thereof, and other similar mechanical connections.

Referring again to FIGS. 3 and 4, the expanding structural adhesive 18 is cured during one of several curing processes that can include, but are not limited to, an electrocoat cure for various portions of the vehicle frame members 26, an independent curing cycle dedicated to the expanding structural adhesive 18, or other curing period for portions of the vehicle frame 10. It is also contemplated that the cure for the expanding structural adhesive 18 is included as a portion of a multi-part cure of one or more portions of the vehicle frame 10. As the cure takes place, the expanding structural adhesive 18 is exposed to heat, wherein the heat serves to activate the expanding structural adhesive 18. Once activated, the expanding structural adhesive 18 increases in volume and changes to have adhesive properties. The adhesive properties of the expanding structural adhesive 18 experienced during the cure allow the expanding structural adhesive 18 to fill the joint cavity 30 and engage and adhere to the inner surface 70 of the joint cavity 30.

Referring now to FIGS. 2-5, it is contemplated that the adhering structure 14 can be disposed at localized areas within the vehicle frame 10, such that minimally sized adhering structures 14 are disposed at specific frame joints 28 of the frame 10 of the vehicle 12. It is contemplated that the embodiments of the adhering structure 14 can be used in areas within certain linear portions of the frame 10 of the vehicle 12, such as linear members of the frame 10 that extend between certain frame joints 28. By way of explanation, and not limitation, the adhering structure 14 can be positioned upon or within the frame 10 at linear portions extending between two frame joints 28 of the roof frame 82. In various alternate embodiments, it is contemplated that the adhering structure 14 can extend substantially around a perimeter 80 of the frame 10 of the vehicle 12, such as around the perimeter 80 of the roof frame 82 of the vehicle 12. Regardless of the size and configuration of the adhering structure 14, the expanding structural adhesive 18, when in the structural state 24, is configured to substantially fill the interstitial space 84 within the joint cavity 30 that is defined by the plurality of frame members 26 and the adhesive carrier 16.

In the various embodiments, the adhesive carrier 16 of the adhering structure 14 is sized such that when the expanding structural adhesive 18 is disposed on the outer surface 20 of the adhesive carrier 16, and the expanding structural adhesive 18 is in the contracted state, the adhering structure 14 is at least slightly smaller than the interstitial space 84 defined between the inner surface 70 of the joint cavity 30 and the adhesive carrier 16. The adhesive carrier 16 is further sized such that the expanding structural adhesive 18, when cured, is configured to expand a sufficient distance away from the adhesive carrier 16 to substantially fill the interstitial space 84 of the joint cavity 30 between the adhesive carrier 16 and the various vehicle frame members 26 that define the frame joint 28 of the frame 10. The size of the adhesive carrier 16 and the amount and/or thickness of the expanding structural adhesive 18 can vary depending on several factors that include, but are not limited to, the configuration of the frame joint 28 and the joint cavity 30, the type of expanding structural adhesive 18, the temperature and duration of the cure, the desired strength of the frame joint 28, the material of the frame members 26 and the adhesive carrier 16, among others.

Referring again to FIGS. 1-5, the expanding structural adhesive 18 can include various bonding agents that can include, but are not limited to, epoxy, acrylic, urethane, anaerobic adhesives, multi-part adhesives, film-type adhesives, fluid-type adhesives and other various adhesives that expand to form a structural bond. It is contemplated that the expanding structural adhesive 18 is bonded to various frame members 26 that can include, but are not limited to, roof frame members, floor frame members, pillar members, and various other frame members within the vehicle 12 and frame 10. These various frame members 26 can be made of various materials that can include, but are not limited to, aluminum, aluminum alloys, composite, steel, combinations thereof, and other various vehicle framing materials 26. The adhesive carrier 16 of the adhering structure 14 that receives the expanding structural adhesive 18 in the installation state 22 can be made of various materials that can include, but are not limited to, aluminum, aluminum alloys, steel, steel alloys, composite, plastic, rubber, one or more polymers and other various substantially rigid materials. It is further contemplated that the adhesive carrier 16 can be an extrudable material wherein the adhesive carrier 16 can be extruded to the exact dimensions necessary for installation within the joint cavity 30. It is also contemplated that the adhesive carrier 16 and the expanding structural adhesive 18 can be a co-extruded system wherein the adhesive carrier 16 and the expanding structural adhesive 18 are extruded as a single unit and substantially dimensioned for installations in the various applications within the vehicle frame 10.

As illustrated in FIGS. 1-5, it is contemplated that the adhering structure 14 can be used to form a structural attachment between certain body panels 100, retain body panels 100 to portions of the frame 10, or other similar structural connections within the vehicle 12. Additionally, while the adhering structure 14 can be used in locations of the vehicle 12 that may be difficult for placing mechanical fasteners or welds, the adhering structure 14 can also be used instead of or in addition to welds or mechanical fasteners, even in conditions where accessing the connection point is not difficult.

Figure 6:
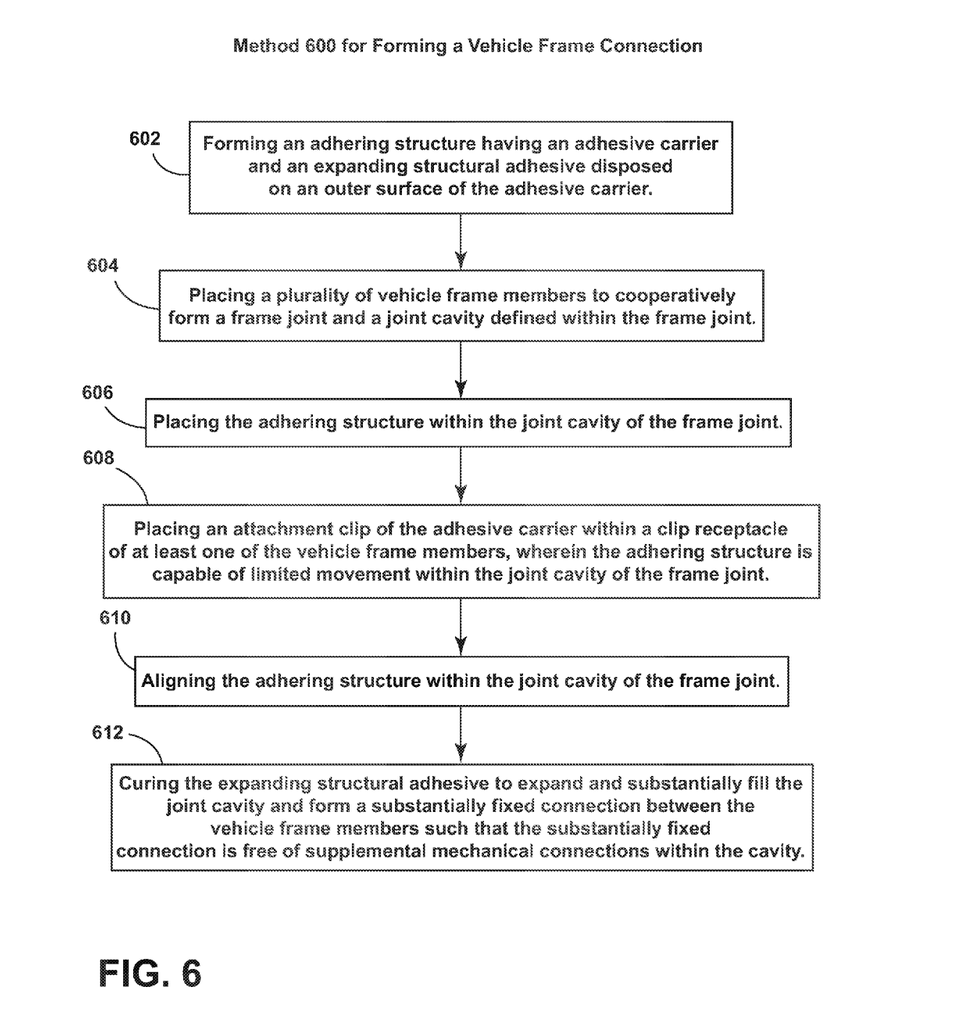
FIG. 6 is a schematic flow diagram illustrating a method for forming a vehicle frame connection using an expandable reinforcement within a vehicle frame.

Having described the general structure and configuration of the adhering structure 14, including the adhesive carrier 16 and the expanding structural adhesive 18, a method 600 for forming a vehicle frame connection is described herein for incorporating the adhering structure 14 within the frame 10 of a vehicle frame connection for providing a structural connection between various frame members 26 within a joint cavity 30 defined by the connection between the various frame members 26. According to the method 600, one step includes forming an adhering structure 14 having an adhesive carrier 16 and an expanding structural adhesive 18 disposed on at least a portion of an outer surface 20 of the adhesive carrier 16, and wherein the expanding structural adhesive 18 is in a contracted state (step 602). Another step in the method includes placing a plurality of vehicle frame members 26 in a pre-determined configuration to cooperatively form a frame joint 28 and a joint cavity 30 defined within the frame joint 28 (step 604). The adhering structure 14 is then placed within the joint cavity 30, wherein the adhering structure 14 is capable of limited movement within the joint cavity 30 when the expanding structural adhesive 18 is in the contracted state (step 606).

Referring again to FIG. 6, according to various embodiments of the method, the adhesive carrier 16 can include an integral attachment clip 40 that engages at least one of the plurality of vehicle frame members 26. In such embodiments, the attachment clip 40 includes a post 42 that extends from a surface of the adhesive carrier 16 and includes a retaining feature 44 at the opposing end of the post 42. As the adhering structure 14 is disposed within the joint cavity 30, the retaining feature 44 is disposed within a receptacle defined within one or more of the vehicle frame members 26, wherein the retaining feature 44 is substantially secured within the clip receptacle 46 (step 608). Once the adhering structure 14 is disposed within the joint cavity 30, the adhering structure 14 is configured such that the post 42 is afforded some limited movement within the clip receptacle 46. During performance of the method, the adhering structure 14 can be manipulated within the joint cavity 30 to insure proper alignment of the adhering structure 14 within the cavity (step 610). Additionally, the limited movement afforded to the adhering structure 14 within the cavity allows the adhering structure 14 to move during curing of the expanding structural adhesive 18, such that the expanding structural adhesive 18 can be evenly adhered throughout the inner surface 70 of the joint cavity 30.

Referring again to FIG. 6, another step in the method 600 includes curing the expanding structural adhesive 18, such that the expanding structural adhesive 18 expands to a structural state 24 (step 612). When in the structural state 24, the expanding structural adhesive 18 substantially fills the joint cavity 30 and forms a substantially fixed connection between the plurality of vehicle frame members 26. In this manner, the plurality of vehicle frame members 26 can be attached at the joint cavity 30 without the need for additional mechanical connections or welds within the joint cavity 30.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An adhering structure for a vehicle frame, the adhering structure comprising:
an adhesive carrier;
an expanding structural adhesive coupled to the adhesive carrier, wherein the expanding structural adhesive includes an installation state and a structural state, the structural state having a larger volume than the installation state, wherein when the expanding structural adhesive is in the installation state the adhesive carrier is configured for placement within a joint cavity of a frame joint, and wherein when the expanding structural adhesive is in the structural state the expanding structural adhesive is configured to occupy the joint cavity of the frame joint and secure the frame joint substantially free of supplemental mechanical connections.

2. The adhering structure of claim 1, wherein the expanding structural adhesive is formed with the adhesive carrier.

3. The adhering structure of claim 1, wherein the adhesive carrier is configured for placement in a roof frame joint of the vehicle frame.

4. The adhering structure of claim 1, further comprising:
an alignment clip that extends from the adhesive carrier, wherein the alignment clip is configured to extend between a portion of the frame joint and the adhesive carrier.

5. The adhering structure of claim 1, wherein the expanding structural adhesive is disposed on an outer surface of the adhesive carrier.

6. A vehicle comprising:
a vehicle frame having a joint;
an adhesive carrier; and
an expanding structural adhesive coupled with the adhesive carrier and fixedly securing the joint, the adhesive carrier and the expanding structural adhesive substantially filling a joint cavity of the joint.

7. The vehicle of claim 6, wherein the expanding structural adhesive is disposed on an outer surface of the adhesive carrier.

8. The vehicle of claim 6, wherein the adhesive carrier and the expanding structural adhesive are disposed within a frame joint proximate a vehicle roof.

9. The vehicle of claim 6, wherein the expanding structural adhesive includes an installation state and a structural state, wherein the structural state has a larger volume than the installation state.

10. The vehicle of claim 9, further comprising:
an alignment clip that extends between the joint and the adhesive carrier.

11. The vehicle of claim 9, wherein the structural state of the expanding structural adhesive substantially fills an interstitial space in the joint cavity defined between the joint and the adhesive carrier.

12. The vehicle of claim 10, wherein the alignment clip includes a post and a retaining feature, and wherein a frame member of the joint includes a clip receptacle for receiving and securing the retaining feature of the alignment clip, wherein the post of the alignment clip is slidably engaged with the clip receptacle, wherein the adhesive carrier is allowed limited movement within the joint cavity when the alignment clip is secured within the clip receptacle and the expanding structural adhesive is in the installation state.

13. The vehicle of claim 6, wherein the joint, the adhesive carrier and the expanding structural adhesive defines a frame joint of the vehicle frame that is free of supplemental mechanical connections proximate the joint cavity.

14. A method of forming a vehicle frame joint comprising steps of:
forming an adhesive carrier;
disposing an expanding structural adhesive in engagement with the adhesive carrier, wherein the expanding structural adhesive is in a contracted state;
forming a frame joint defining a joint cavity therein;
placing the adhesive carrier within the joint cavity, wherein the expanding structural adhesive in is the contracted state; and
curing the expanding structural adhesive to define a structural state, wherein the expanding structural adhesive substantially fills the joint cavity and forms a substantially fixed connection between a plurality of vehicle frame members of the frame joint, and wherein the substantially fixed connection is free of supplemental mechanical connections.

15. The method of claim 14, wherein the step of disposing the expanding structural adhesive in engagement with the adhesive carrier occurs before the step of placing the adhesive carrier within the joint cavity.

16. The method of claim 14, wherein the adhesive carrier and the expanding structural adhesive are co-extruded.

17. The method of claim 14, wherein an alignment clip extends between the adhesive carrier and the frame joint.

18. The method of claim 14, wherein the frame joint is a connection between a vehicle roof frame and a vehicle pillar.

19. The method of claim 18, wherein the adhesive carrier extends substantially around a perimeter of the vehicle roof frame.

20. The method of claim 19, wherein the adhesive carrier is adapted to form a substantially fixed connection between each vehicle pillar and the vehicle roof frame.

* * * * *